US011533849B2

United States Patent
Tiessen et al.

(10) Patent No.: US 11,533,849 B2
(45) Date of Patent: Dec. 27, 2022

(54) ATTACHMENT COMPRISING PICKING ROTORS WITH FEEDER SLATS AND SHEAR BARS ARRANGED IN INTERMEDIATE SPACES BETWEEN FEEDER SLATS

(71) Applicant: Carl Geringhoff GmbH & Co. KG, Ahlen (DE)

(72) Inventors: Reimer Tiessen, Oldenburg (DE); Johannes Hense, Wadersloh (DE); Andre Hemmesmann, Sassenberg (DE); Frank Schlamann, Gronau (DE); Rüdiger Steen, Bunde (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 273 days.

(21) Appl. No.: 16/756,133

(22) PCT Filed: Oct. 16, 2018

(86) PCT No.: PCT/EP2018/078262
§ 371 (c)(1),
(2) Date: Apr. 15, 2020

(87) PCT Pub. No.: WO2019/076906
PCT Pub. Date: Apr. 25, 2019

(65) Prior Publication Data
US 2020/0236854 A1 Jul. 30, 2020

(30) Foreign Application Priority Data
Oct. 18, 2017 (DE) .................... 10 2017 124 322.4

(51) Int. Cl.
*A01D 45/02* (2006.01)
*A01F 11/06* (2006.01)
*A01D 43/08* (2006.01)

(52) U.S. Cl.
CPC .......... *A01D 45/025* (2013.01); *A01D 43/082* (2013.01); *A01F 11/06* (2013.01)

(58) Field of Classification Search
CPC ...... A01D 45/025; A01D 45/02; A01D 45/21; A01D 43/082; A01F 11/06
See application file for complete search history.

(56) References Cited

U.S. PATENT DOCUMENTS 2,604,750 A * 7/1952 Fergason ............. A01D 45/025
56/104
3,100,491 A 8/1963 Dillon
(Continued)

FOREIGN PATENT DOCUMENTS

DE 1 242 035 6/1967
DE 91 05 932 8/1991
(Continued)

*Primary Examiner* — Arpad F Kovacs
(74) *Attorney, Agent, or Firm* — Gudrun E. Huckett

(57) ABSTRACT

An attachment for connection to a harvester comprises a plurality of picking devices (2) arranged next to each other and in a distributed manner along the working width. Each picking device (2) has a picking gap (6), below which are disposed at least two picking rotors (10) which can be driven to rotate in opposite directions, the picking rotors (10) being provided with flutes (12), which project in a radial direction beyond the rotor casing (16) and the enveloping circles (20) of which mesh with each other. To propose a way of easily adapting the picking rotors to different harvesting conditions without having to replace them all, the invention proposes for one or more shear bars (18) which are releasably connected to the picking rotor (10) and/or to the flutes (12) to be inserted in the intermediate space (22) between adjacent flutes (12) of a picking rotor (10), the shear bars filling portions of said intermediate space during a rotating movement of the picking rotors (10).

10 Claims, 9 Drawing Sheets

(56) References Cited

U.S. PATENT DOCUMENTS

| | | | | |
|---|---|---|---|---|
| 4,233,804 A * | 11/1980 | Fischer | A01D | 45/025 56/104 |
| 5,269,126 A * | 12/1993 | Kalverkamp | A01D | 45/025 56/60 |
| 5,282,352 A * | 2/1994 | Schoolman | A01D | 45/025 56/62 |
| 5,404,699 A * | 4/1995 | Christensen | A01D | 45/025 460/33 |
| 6,216,428 B1 * | 4/2001 | Becker | A01D | 45/025 56/104 |
| 7,469,524 B2 * | 12/2008 | Rieck | A01D | 45/025 56/104 |
| 7,886,510 B2 * | 2/2011 | Calmer | A01D | 45/025 56/103 |
| 9,560,804 B1 * | 2/2017 | Calmer | A01D | 45/025 |
| 11,032,971 B2 * | 6/2021 | Coon | A01D | 45/025 |
| 11,129,332 B2 * | 9/2021 | Coon | A01F | 11/06 |
| 2004/0016219 A1 * | 1/2004 | Calmer | A01D | 45/025 56/51 |
| 2009/0249759 A1 * | 10/2009 | Calmer | A01D | 45/025 56/106 |
| 2014/0182255 A1 * | 7/2014 | Calmer | A01D | 45/025 56/104 |
| 2016/0338268 A1 * | 11/2016 | Calmer | A01D | 45/025 |
| 2017/0188517 A1 | 7/2017 | Schloesser et al. | | |
| 2017/0311542 A1 * | 11/2017 | Ehle | A01D | 45/025 |

FOREIGN PATENT DOCUMENTS

| | | | | |
|---|---|---|---|---|
| DE | 197 14 623 | | 6/1998 | |
| EP | 0 355 441 | | 2/1990 | |
| EP | 1 040 746 | | 10/2000 | |
| HU | 0200658 | | 7/2002 | |
| HU | 0900406 | | 1/2011 | |
| WO | 01/08465 | | 2/2001 | |
| WO | WO-2014165192 A1 * | 10/2014 | | A01D 45/025 |
| WO | WO-2017023851 A1 * | 2/2017 | | A01D 45/025 |
| WO | WO-2018035537 A1 * | 2/2018 | | A01D 45/025 |
| WO | WO-2018049225 A1 * | 3/2018 | | A01D 45/025 |

* cited by examiner

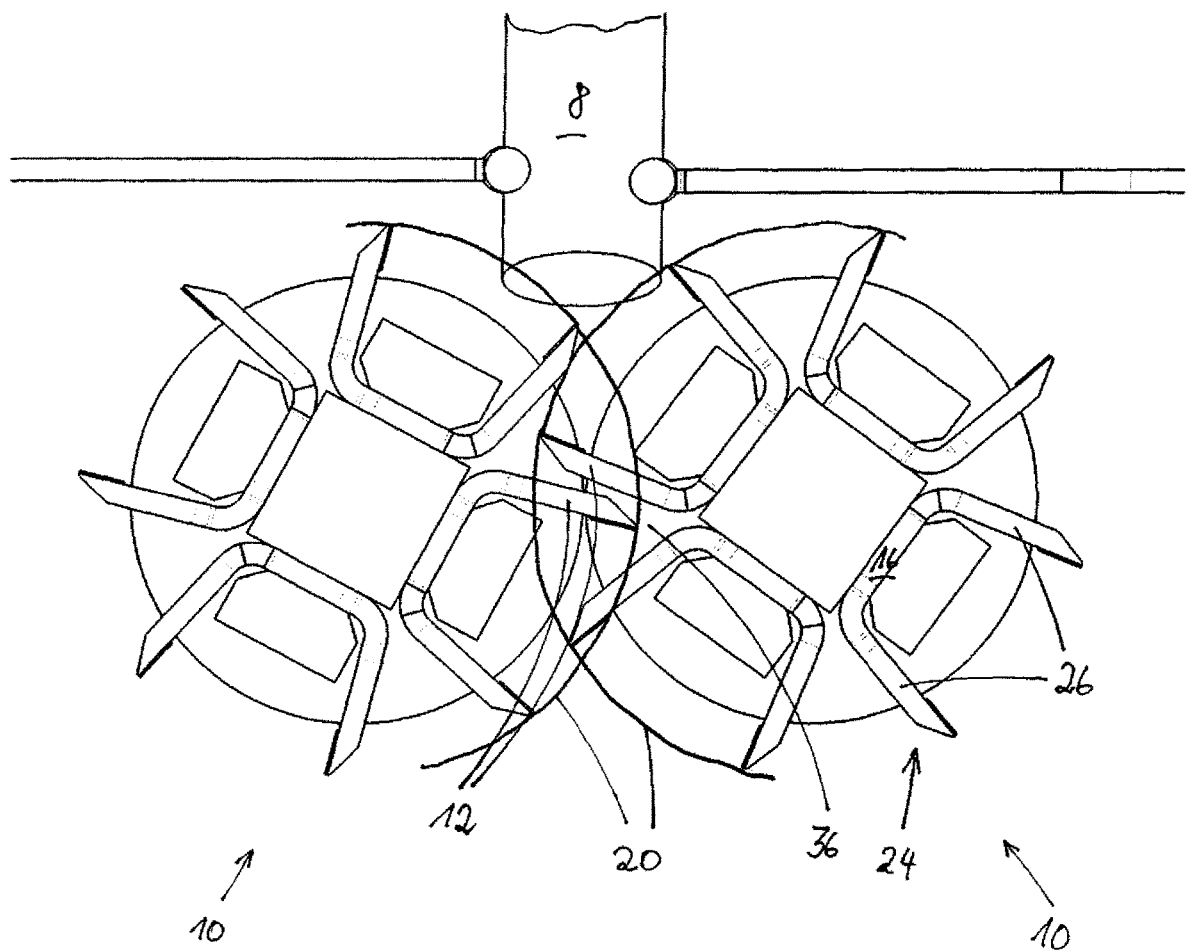

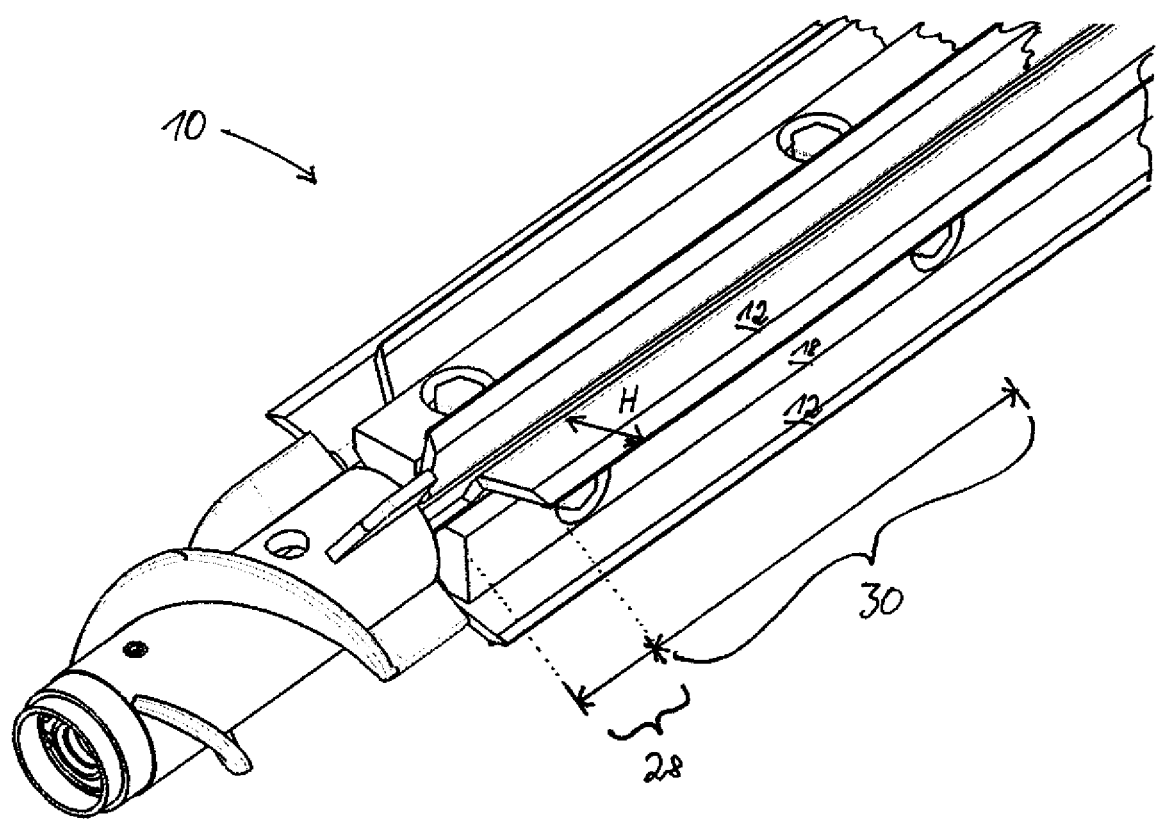

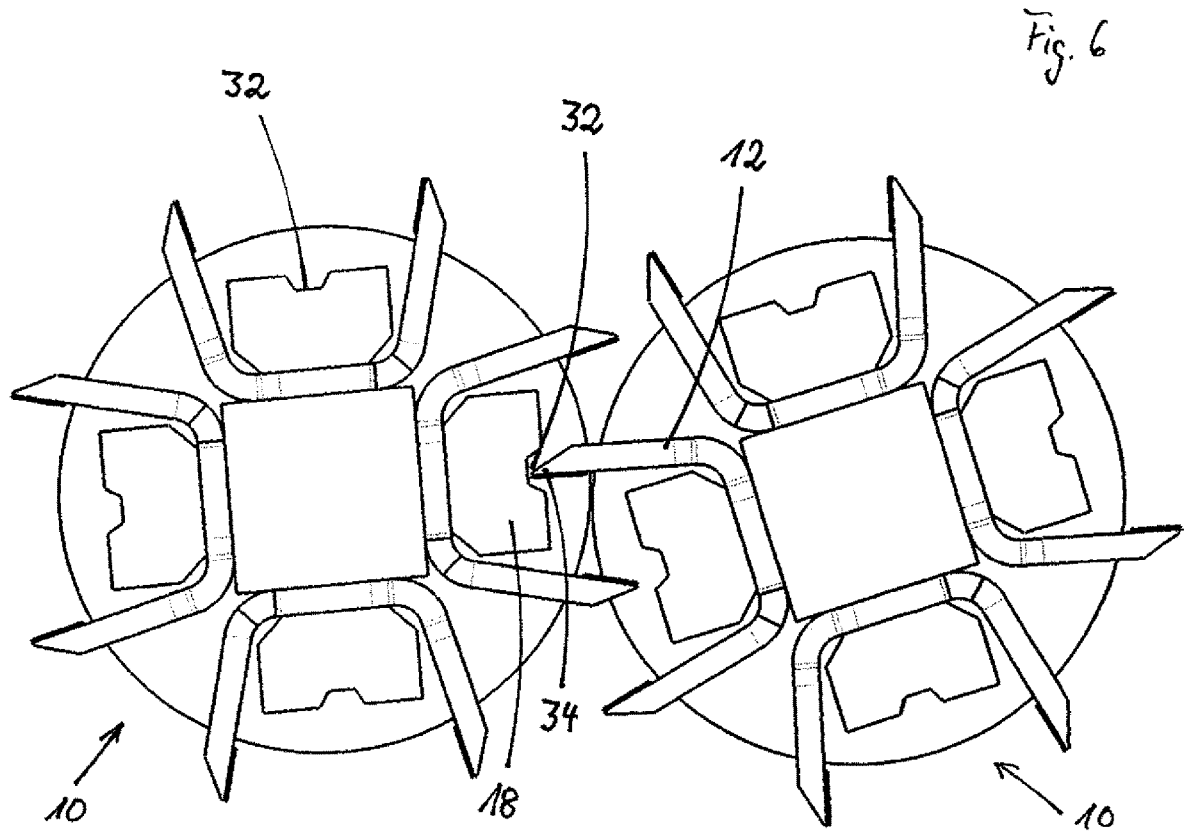
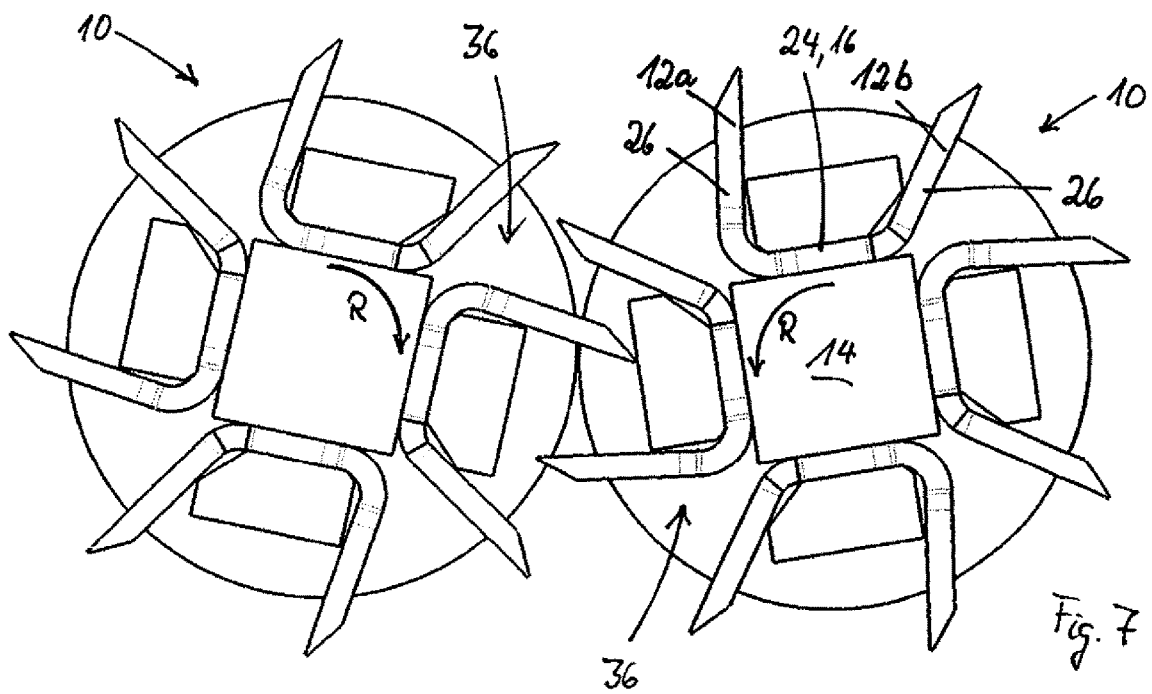

ATTACHMENT COMPRISING PICKING ROTORS WITH FEEDER SLATS AND SHEAR BARS ARRANGED IN INTERMEDIATE SPACES BETWEEN FEEDER SLATS

BACKGROUND OF THE INVENTION

The present invention relates to an attachment for connection to a harvester with a plurality of picking devices arranged adjacent to each other and distributed across the working width; the picking devices each comprise a picking gap underneath which at least two oppositely rotatingly driveable picking rotors are arranged, and the picking rotors are provided with feeder slats that project in radial direction past the rotor jacket and mesh with each other with their envelope circles.

An attachment of the aforementioned kind is disclosed in the publication DE 1 242 035. The picking rotors disclosed therein are assembled of four profiled sections with L-shaped cross section such that the profiled sections with their longer legs delimit a square interior and the short legs together with an adjoining projection of the longer legs each form a double-layer wing which respectively serves as a feeder slat in order to pull a plant stalk downwardly. The outer edges of the wings are slanted and form in this way cutting edge-like grip edges with which the plant stalks gripped by them are at least partially cut. However, the wings are not to cut all the way through the plant stalks but only exert a great picking force onto the plants. It is described that the picking rotors are arranged in pairs relative to each other such that the outer edges of the wings upon rotation of the picking rotors mesh with each other such that they pass each other at a narrow distance without however contacting each other. A readjustment of the wings is not possible so that with continuing wear of the grip edges the working quality of the attachment deteriorates. When the plant stalks are to be cut, separate chopping devices, for example, rotatingly circulating chopping knives arranged below the picking rotors are required, that cause a high additional constructive expenditure and have a high energy consumption during operation.

Another attachment of the aforementioned kind is disclosed in DE 91 05 932.1. The feeder slats on the picking rotors are arranged and configured such that upon rotation of the picking rotors the cutting edge of the feeder slats of the leading picking rotor passes the front side of the feeder slat of the following picking rotor at a minimal spacing from the exterior to the interior so that a kind of a chipping cut is provided. Here also a readjustment of the feeder slats is not possible and additional chopping devices are required when the plant stalks are to be cut reliably.

The two publications of the prior art discussed above illustrate that different requirements can be posed upon pulling the plant stalks into the picking device. Depending on thickness, length, and degree of lignification of the plant stalks, a different cutting and clamping behavior of the feeder slats is desired. There are harvesting conditions in which a strong and safe cut of the plant stalks by means of the feeder slats is advantageous but there are also harvesting conditions in which a cut is precisely not desired and the plant stalk is only to be bent as it is pulled through the picking rotors. The known picking rotors however provide no possibility of adapting the feeder slats to different requirements. In order to adjust the attachment to different requirements, the picking rotors as a whole must be exchanged for other picking rotors of a different construction. Also, a readjustment of the feeder slats is not possible so that the feeder slats upon wear must always be exchanged when the deteriorated work result is no longer acceptable.

It is the object of the present invention to propose a solution how the picking rotors can be adapted in a simple way to different harvesting conditions without having to be exchanged as a whole.

SUMMARY OF THE INVENTION

The object is solved for an attachment of the aforementioned kind in that, into the intermediate space between neighboring feeder slats of a picking rotor, one or a plurality of shear bars are inserted that are detachably connected to the picking rotor and/or the feeder slats and fill sections of the intermediate space upon a rotating movement of the picking rotors.

Due to the shear bars it is possible to design as desired the intermediate space between the outer edges of the feeder slats of the oppositely positioned picking rotor and the surface of the picking rotor provided with the one or more shear bars and modify it by exchanging the shear bars without having to exchange the picking rotors as a whole for this purpose. A picking rotor can be operated entirely without shear bars but it is possible to attach them as needed, either already by the manufacturer in case of new picking rotors or by retrofitting the attachment by the user. The shear bars can extend across the full length of an intermediate space along the longitudinal axis of a picking rotor but it is also possible to insert the shear bars only across a partial length into an intermediate space. For example, in a receiving region of a picking rotor no or only a flat shear bar can be inserted into the intermediate space in order to design it more voluminous and thus with a greater swallowing capacity for receiving and pulling in the plant stalks.

In case of shear bars with a greater thickness, the intermediate space is filled to a greater degree while for shear bars with a reduced thickness a greater intermediate space remains unoccupied for a given geometry of the feeder slats. The shear bars have a beneficial cross-sectional shape for their respective purpose. The smaller the intermediate space between neighboring feeder slats of a picking rotor, the stronger the plant stalks are squeezed in the region of the intermediate space by the feeder slat of the oppositely positioned picking rotor plunging into it. A strong squeezing of a stalk is beneficial to rotting of the stalk residues on the field because microorganisms can better penetrate into the inner partially hollow region of the stalk pieces and from there can decompose the stalk residues. Depending on the thickness of the plant stalks to be processed, the size of the intermediate space can then be optimally adapted thereto by use of suitable shear bars. Upon rotational movement of the picking rotors, the cutting and shearing function changes continuously from one to the other picking rotor and back, just as the legs of the feeder slats alternatingly plunge into the envelope circle of the oppositely positioned picking rotor, pass through it, and exit again from it.

The shear bar can extend across the full length of the intermediate space between two neighboring feeder slats, or it is divided into several sections. The shear bar can also be combined of several layers of shear bars so that a desired construction height of the shear bar is provided. Due to the combination of several layers to a desired construction height, the construction height of a shear bar can be adjusted to an individual desired dimension. Also, in case of a multi-layer configuration, worn layers can be exchanged for new layers so that the replacement part costs are reduced.

When the cutting edges of the feeder slats become worn and shorter due to use, this material loss can be compensated by inserting the shear bars into the picking rotors. The shear bars form an effective surface that has still only a minimal or no spacing at all to the outer edges of the feeder slats. The shear bars can be made of a metallic material in order to provide for a satisfactory service life for the harvesting use.

According to an embodiment, the shear bars have a shape with which they can also be attached, turned from front to back, to the picking rotor. Due to the turned mounting, differently worn zones of the shear bars can be utilized for an approximately continuous wear across the length.

The shear bars can be attached to the feeder slats or to the rotor body. Since the feeder slats are already exposed to significant mechanical loads from contacting the plant stalks, fastening to the rotor body is preferred however.

The detachable connection of the shear bars to the picking rotors can be realized, for example, by a screw connection, a locking connection, a form-fit connection by insertion into a dovetail profile, a tongue and groove connection, a bayonet closure or the like. Important is that the shear bars can be exchanged with minimal mounting expenditure because they are prone to wear and should be easily and quickly exchangeable in a repair situation.

Depending on the size of the remaining intermediate space, in particular the remaining distance produced between the outer edges of the feeder slats of the oppositely positioned picking rotor and the surface of the picking rotor provided with the one or a plurality of shear bars, a cutting action of the feeder slats of different aggressiveness is provided. The smaller the remaining distance, the deeper an oppositely positioned feeder slat cuts into a plant stalk because the plant stalk cannot evade against the surface of the shear bar. Depending on the geometries of the feeder slats and their arrangement in relation to the shear bars, the cutting action of the picking rotors can be maintained so high across the entire period of use of the feeder slats that the employment of separate chopping devices can even be omitted, depending on the conditions of use.

The shear bar can be designed with regard to its height such that the spacing is reduced to almost zero or to zero or the feeder slat even penetrates into the material of the shear bar which would be possible without any harm, for example, when the shear bar is made of a plastic material. The shear bar forms in this way an anvil or a counter cutting edge to the cutting edge of an oppositely positioned feeder slat.

When the shear bar fills the intermediate space between two neighboring feeder slats not only in the region of the cutting edge of the oppositely positioned feeder slat but also at least partially before and behind when viewed in rotational direction, the free space becomes smaller into which the plant stalk upon passing through the intermediate space between the picking rotors can escape when a stalk section is gripped by a feeder slat and pushed to the side. The decreased free space increases in this way the conveying aggressiveness and the cutting action of the feeder slats of a picking rotor pair.

During the use of an attachment, the feeder slats wear which is noticeable in particular due to a continuously decreasing length of the leg of the feeder slat projecting in the radial direction. Due to the feeder slats wearing over time, the conveying and cutting quality of the picking rotors deteriorates in conventional attachments until finally they work so badly that they must be completely exchanged. Due to the shear bars, there is the possibility of counteracting an increasing wear and the thus incurred deteriorating work performance of the feeder slats in that the aggressiveness of the feeder slats is increased again by installing thicker shear bars which compensate the material loss at the feeder slats completely or partially. The thicker shear bars can be used also only in the sections of a picking rotor in which an increased wear at the feeder slats can in fact be noticed as, for example, frequently in the leading sections of the picking rotors. The picking rotors can be utilized much longer due to the exchange of the shear bars as would be the case without use of shear bars for identical work output.

When in the present description, reference is being had to in front or behind, these terms are always to be understood in relation to the forward travel direction of the harvesting attachment into the crop of the upright harvest material.

According to an embodiment of the invention, not every feeder slat of a picking rotor does have a shear bar applied to the oppositely positioned picking rotor. A picking rotor can be provided with a plurality of feeder slats, for example, with four, six, eight or with ten feeder slats. It is not necessary that for each feeder slat of a picking rotor a corresponding shear bar is present on an oppositely positioned picking rotor. It is instead possible to provide a shear bar, for example, only for every other, third, or fourth feeder slat when the cutting length of the cut pieces of the plant stalk is then still sufficiently short. In the regions in which a shear bar for an oppositely positioned feeder slat is missing on the surface of a picking rotor, the plant stalk for a correspondingly large intermediate space is rather not cut but only squeezed and bent whereby however also the energy expenditure for conveying the plant stalks and the wear at the corresponding components are reduced.

According to an embodiment of the invention, for the feeder slats of a picking rotor shear bars with different construction heights are applied to the oppositely positioned picking rotor. The shear bars which are applied to a picking rotor must not all have the same construction height. By means of shear bars of different height, the cutting and conveying aggressiveness of the feeder slats cooperating therewith can be adjusted to be differently strong, which may be desirable about the circulation of the picking rotor.

According to an embodiment of the invention, one or a plurality of shear bars are applied to the profiled body of a feeder slat of a picking rotor. Due to the application of the shear bars to the profiled body of a feeder slat, these components can be connected together to the support structure of the picking rotor, in particular screwed on. Due to the placement and contact at each other, the components can support each other and reinforce each other, respectively. Mounting is simplified.

According to an embodiment of the invention, the surfaces of the shear bars facing the oppositely positioned picking rotors have a structure. The structure effects an increased roughness of the surface. The structure can be in the form of individual or a plurality of longitudinal grooves, transverse grooves, raised portions, recesses, hard surfacing, coatings and/or overlays of a more wear-resistant material than the carrier material, or the like. Due to the structure, the shear bars can more aggressively process the crop. This is in particular advantageous in order to facilitate and accelerate rotting of the plant stalks on the field. Due to the lignin which is located in the region of the outer surface of the stalks, microorganisms are hindered from penetrating into the stalks from the exterior. When the lignin-containing layers of the stalk are more strongly damaged due to the structure of the surfaces of the shear bars, rotting is accelerated.

According to an embodiment of the invention, the shear bars are made of a plastic material. The plastic material can handle impacts of cutting edges of corresponding feeder slats without being permanently damaged or damage the cutting edge of the feeder slat. The cutting edge of the corresponding feeder slat can thus plunge without being damaged into the material of the shear bars. In this way, the shear bars and the feeder slats can be arranged relative to each other such that, even taking into consideration all component tolerances, for each revolution of the picking rotors a contact between the feeder slat and the corresponding shear bar is still provided which ensures a particularly reliable cut and squeezing of the stalk. The plastic material also acts in an impact-damping way so that force peaks are absorbed by the material before they can stress and possibly damage the support structure and the bearings and gears of the corresponding picking rotor. The picking rotors rotate thus as a whole more smoothly. In addition, a weight advantage for the entire attachment is provided due to the plastic material.

According to one embodiment of the invention, the feeder slats are the legs of a profiled body of a U-shaped cross section. When mounting a profiled body with a U-shaped cross section, two feeder slats can be attached to the picking rotor at the same time. In cooperation with the second picking rotor, one of the legs can fulfill a cutting function, in particular with a cutting edge formed at the end thereof while the other leg can fulfill a conveying and squeezing function. While one of the two legs of a first profiled body attached to a first picking rotor plunges into the interior of the second profiled body attached to the oppositely positioned second picking rotor, the second leg of the first profiled body upon further rotational movement of the two interacting picking rotors plunges into the intermediate space between two neighboring profiled bodies on the second picking rotor. When in one immersion region a shear bar is positioned and in another one there is none, a different cutting and squeezing action is provided due to the different spacings of the blade edges to the components of the oppositely positioned picking rotor. This cutting and squeezing action can moreover be advantageously enhanced by a suitable configuration of the geometries of the legs of the profiled bodies. With the combined cutting and squeezing by the legs of the profiled body, a particularly good disintegration of the stalk pieces discharged onto the field is provided. In cross section, the free legs of the U-shaped profiled body must not be positioned precisely at a right angle to the base but can also be positioned at a different angle thereto. In particular, asymmetrically configured cross-sectional shapes are possible also.

According to an embodiment of the invention, the shear bars are applied to the base of the U-shaped profiled body. Due to the application to the base of the U-shaped profiled body, above the outwardly facing surface of the shear bars a working chamber is provided into which the material is immersed and therein intensively squeezed and cut as a plant stalk passes through the picking rollers.

At the surface of the shear bars, an intensive friction action on the outer walls of the plant stalk is realized in cooperation with the feeder slats of the oppositely positioned picking rotor plunging during one rotation into the profiled body so that the lignin-containing layers are especially damaged. In this way, rotting of the plant residues is enhanced, as has already been explained above.

According to an embodiment of the invention, the feeder slats with a U-shaped cross section comprise a forward section in which the projecting height of one or both legs relative to a rearward section is embodied shorter. Due to the reduced projecting height of one or both legs, an inlet region of a picking roller is realized in which the cut ends of the stalks slide more easily into the envelope circle of the picking rotors and only thereafter are engaged by the feeder slats and pulled downwardly. In the inlet region, the legs can be shortened to the base of the profiled body in order to design the latter with a greater swallowing capacity.

Further features of the invention result from the claims, the Figures, and the subject matter description. All features and feature combinations disclosed above in the description as well as the features and feature combinations disclosed in the following figure description and/or illustrated solely in the figures can be used not only in the respectively disclosed combination but also in other combinations or individually.

BRIEF DESCRIPTION OF THE DRAWINGS

The invention will now be explained in more detail with the aid of a preferred embodiment as well as with reference to the attached drawings.

It is shown in:

FIG. 4: an end view of FIG. 3 with a different rotational position of the picking rotors relative to each other;

FIG. 5: a view of the inlet region of a picking rotor;

FIGS. 6 and 7: end views of differently designed pairs of picking rotors; and

DESCRIPTION OF PREFERRED EMBODIMENTS

Figure 1:
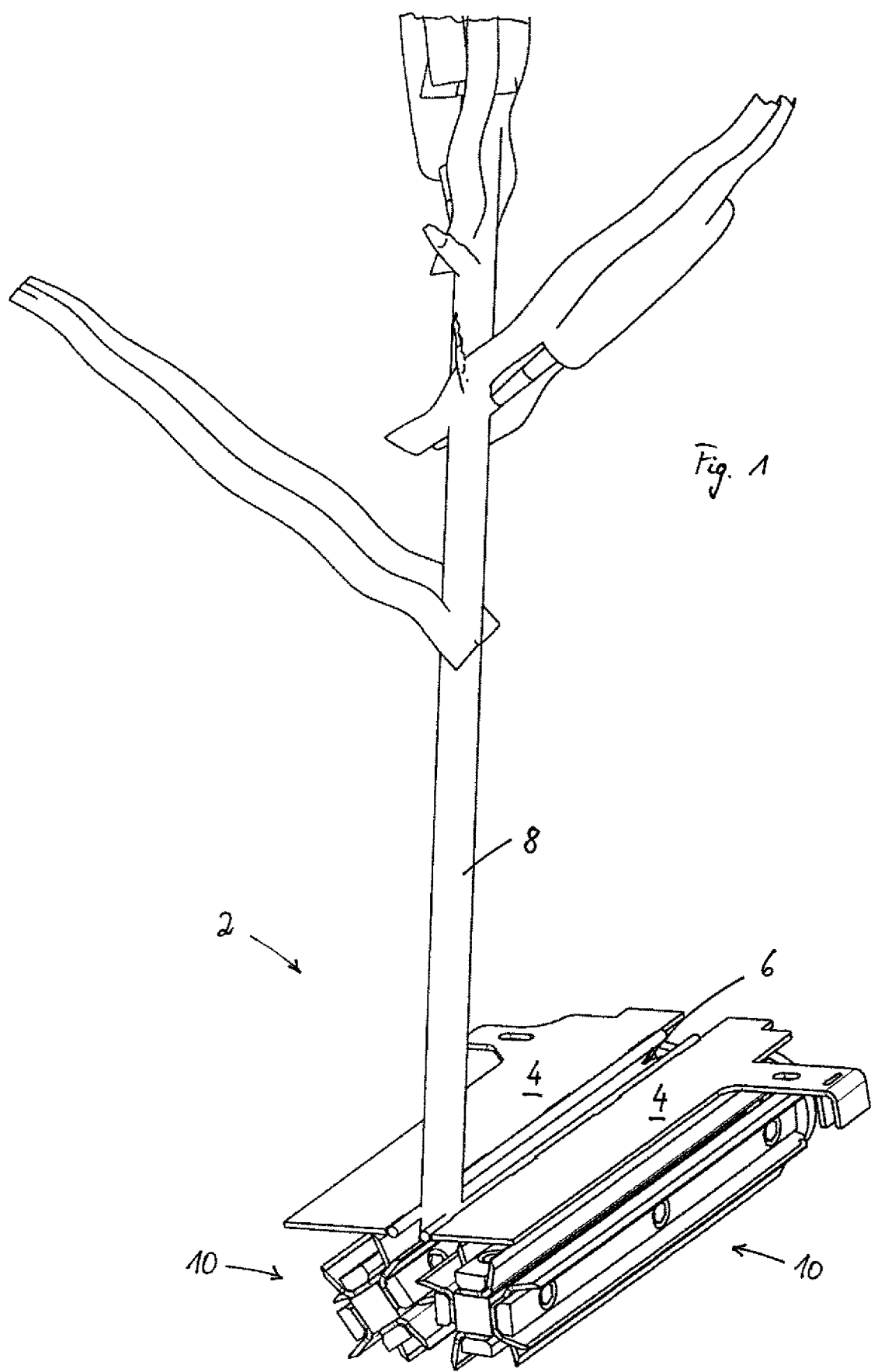
FIG. 1: a view of a picking device with a plant stalk entering the picking device.

In FIG. 1, a view of a picking device 2 with a plant stalk 8 entering the picking device 2 is illustrated. The picking device 2 is comprised of picking plates 4 which delimit a picking gap 6 laterally. The plant stalk 8 is pulled by the picking rotors 10 through the picking gap 6 in downward direction. The cobs projecting away from the plant stalk 8 are retained in this context by the picking plates 4. The cobs are torn off the plant stalk 8 in this context and are then supplied to the threshing device of a harvester while the plant stalks 8 are discharged downward onto the field. In the embodiments, pairs of intake rotors 10 are shown, respectively, but it is also possible to realize the invention for more than two picking rotors.

Figure 2:
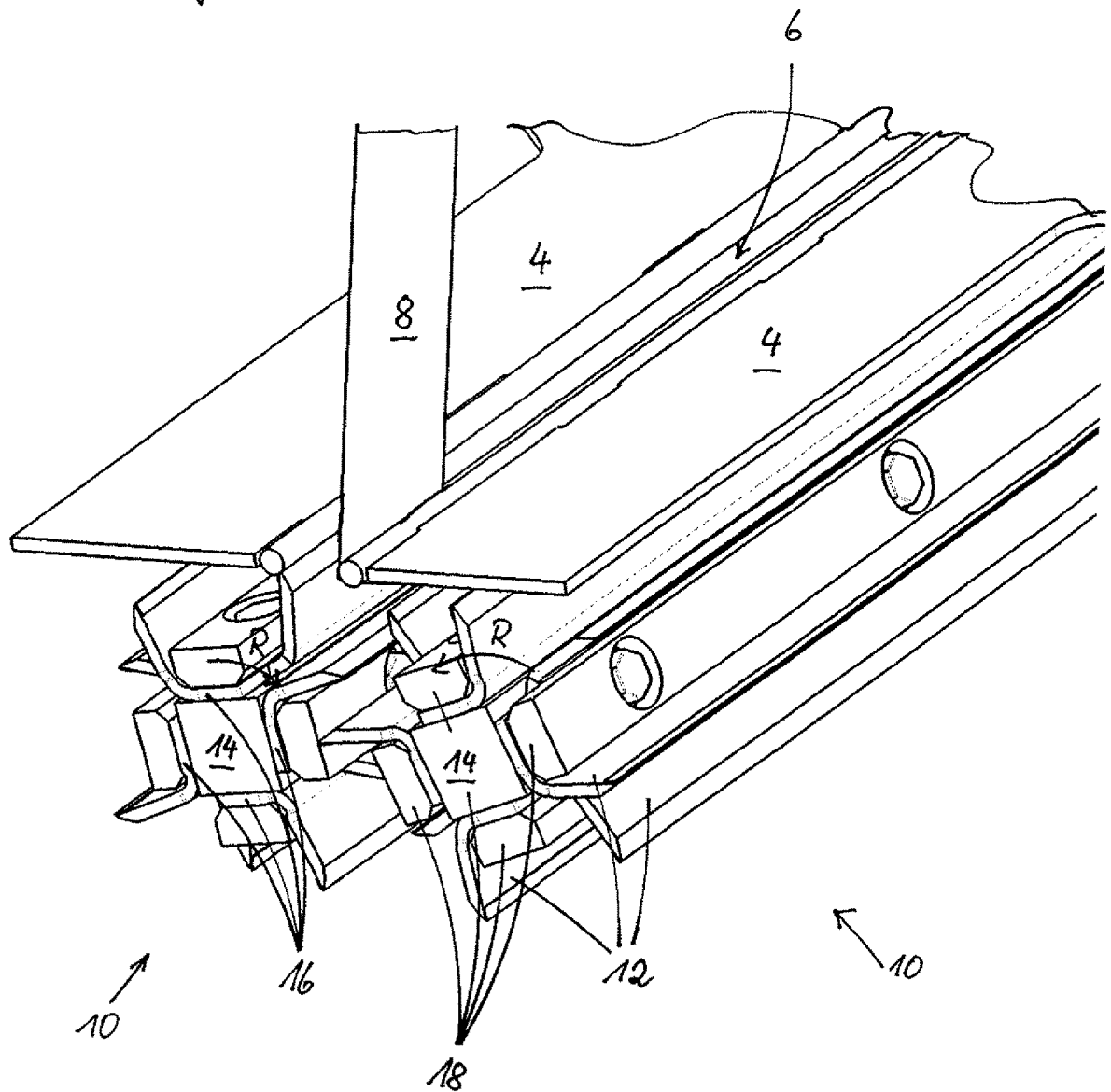
FIG. 2: an enlarged detail of the picking device at a slant from the front.

In FIG. 2, an enlarged view of the picking device 2 at a slant from the front is illustrated. In this enlarged view, the feeder slats 12 can be seen easily which in radial direction, viewed from the shaft 14, are projecting past the rotor jacket 16. The rotor jacket 16 in the embodiment in FIG. 2 is formed by the profiled legs of the feeder slats 12 which are resting on the shaft 14.

A plurality of shear bars 18 are placed onto the rotor jacket 16 in FIG. 2. Upon rotational movement of the picking rotors 10 in rotational direction R, the outwardly pointing cutting edges of the feeder slats 12 move past the surfaces of the shear bars 18 attached to the oppositely positioned picking rotor 10.

Figure 3:
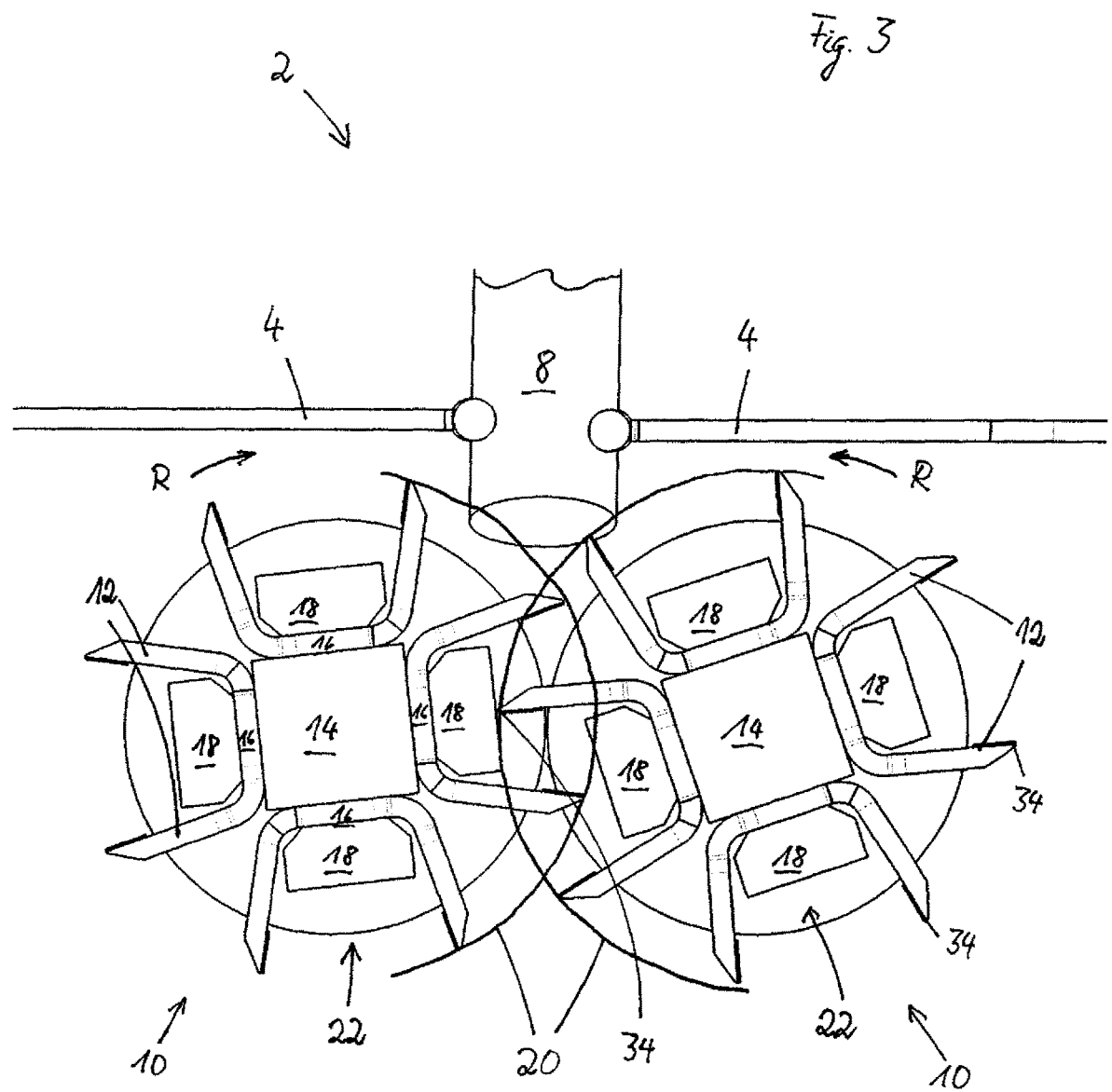
FIG. 3: an end view of the picking device.

In FIG. 3, an end view of the picking device 2 shown in FIGS. 1 and 2 is illustrated. In this end view, it can be seen that the envelope circles 20 of the feeder slats 12 mesh with each other. In this context, the construction height of the shear bars 18 in the embodiment is selected such that the surface of the shear bars 18 are almost in contact with the cutting edges 34 of the feeder slats 12.

The shear bars 18 are inserted respectively into an intermediate space 22 between neighboring feeder slats 12 of a picking rotor 10. The intermediate spaces 22 are respectively reduced due to the inserted shear bars 18 because the intermediate spaces 22 are filled by them in sections. Since the intermediate space 22 between neighboring feeder slats 12 at least partially is filled by the shear bars 18, the material of the incoming plant stalk 8 can no longer escape easily in lateral direction. The shear bars 18 act as counter holders for the feeder slats 12 interacting with them; in this way, they can penetrate deeper into the interior of the plant stalk 8 with their cutting edge 34 and finally can cut off individual stalk pieces.

In particular when comparing the rotational positions of the picking rotors 10 in FIGS. 3 and 4, it is apparent that the feeder slats 12 upon a rotation in rotational direction R cut into the plant stalk, pull it down, squeeze it, and cut it into individual pieces. In this context, every other feeder slat of a picking rotor 10 interacts with a shear bar 18 which is mounted on the rotor jacket 16 of the oppositely positioned picking rotor 10. While in the illustration in FIG. 3 the cutting edge 34 of the feeder slat 12 of the right picking rotor 10 positioned at 9 o'clock almost contacts the shear bar 18 of the oppositely positioned left picking rotor 10 positioned at 3 o'clock and a plant stalk located here is cut through at this location, there is no contact of the cutting edges 34 of the remaining feeder slats 12 to components of the oppositely positioned picking rotor 10 in this rotational position. Thus, in the remaining regions, a plant stalk 8 can only be squeezed and damaged at its surface.

In the rotational position of the picking rotors 10 illustrated in FIG. 4, none of the feeder slats 12 is in contact with a component of the oppositely positioned picking rotor 10. In the region in which the envelope circles 20 of the picking rotors 10 are overlapping, an intensive shearing and squeezing action on a plant stalk which is located in this region is however provided between the feeder slats 12. In this context, a feeder slat 12 plunges deep into the intermediate space 36 in which no shear bar 18 is arranged at the oppositely positioned picking rotor 10.

Across the region in which the envelope circles 20 of the picking rotors 10 are overlapping each other, an open receiving zone is provided into which a plant stalk 8 can move into the intermediate space between the picking rotors 10. Below this region, there is a discharge zone in which the cut and squeezed stalk pieces are discharged onto the ground.

Figure 10:
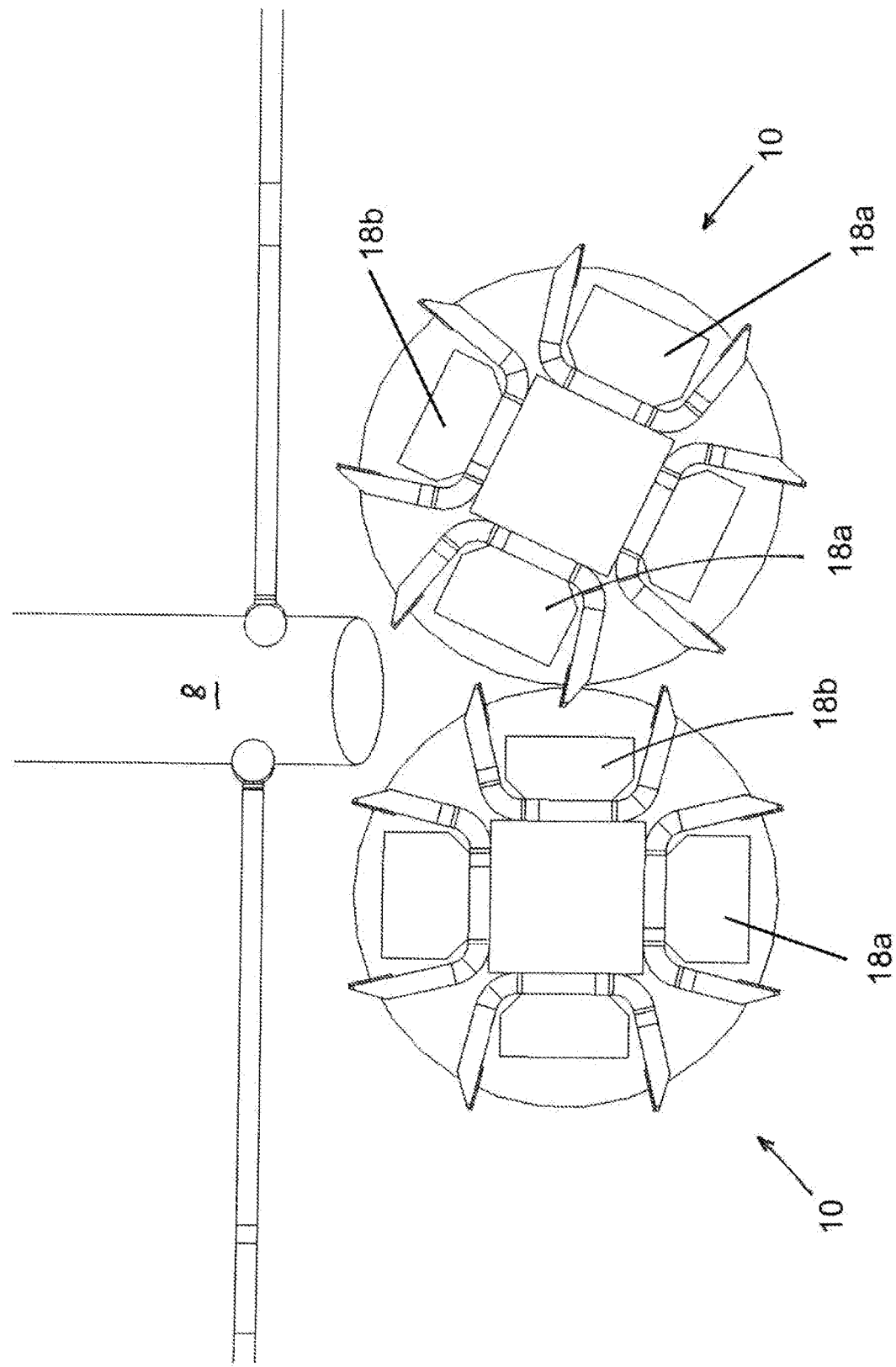
FIG. 10: picking rotors with shear bars of different height.
Figure 11:
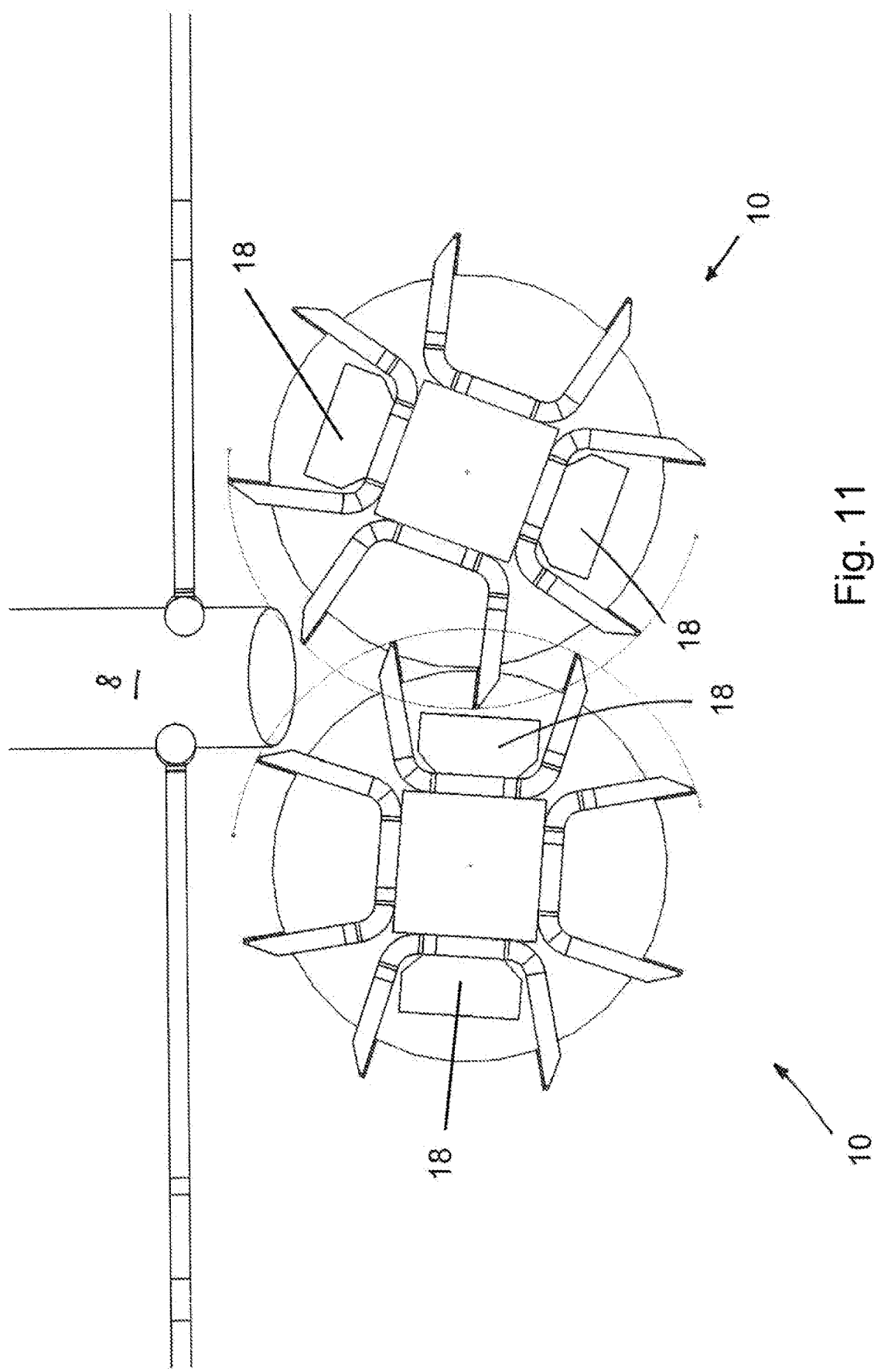
FIG. 11: picking rotors wherein not all of the feeder slats have shear bars associated therewith.

In the embodiment, the shear bars 18 have a uniform construction height. However, it is also possible to provide shear bars 18a, 18b with different construction height on a picking rotor 10 (see FIG. 10). Likewise, it is also possible to exchange the shear bars 18 which can be seen in FIGS. 3 and 4 by those that have a greater or smaller construction height. This is in particular possible in order to compensate wear of the feeder slats 12 at the outer cutting edges.

The Figures show that the shear bars 18 are placed onto a leg of a profiled body 24 of a feeder slat 12 of a picking rotor. The shear bars 18 in the embodiment are screwed to the shaft 14 of the respective picking rotor 10.

In the embodiment, the profiled bodies 24 of the feeder slats 12 have a U-shaped cross section in which the legs 26 which form the feeder slats 12 are projecting away from the rotor jacket 16. The setting angle of the legs 26 illustrated in the embodiment in relation to the rotor jacket 16 can also be embodied in an angular position that deviates from the embodiment. In the embodiment, the shear bars 18 are placed onto the base of the U-shaped profiled body 24.

In FIG. 5, it can be seen that the feeder slats 12 have a forward section 28 in which the projecting height H of a leg 26 relative to a rearward section 30 is designed to be shorter. The forward section 28 forms an ideal inlet region in which the plant stalks 8 with their lower end can enter the effective region of the picking rotors 10. In contrast to the illustration in FIG. 5, it is possible in this inlet region to also design the shear bars 18 more flat or to not use them at all in order to improve here the reception of plant stalks 8.

In FIGS. 6 and 7, end views of differently designed pairs of picking rotors are illustrated. The picking rotors 10 illustrated in FIG. 6 are provided with shear bars 18 which have a groove 32. The cutting edges 34 of the feeder slat 12 plunge in the embodiment into the corresponding groove 32 of the shear bar 18 attached to the oppositely positioned picking rotor 10. By means of the sidewalls of the groove 32, the surfaces of the plant stalks passing through between the picking rotors 10 can be additionally squeezed and abrasively disintegrated.

In FIG. 7, the feeder slats 12a, 12b are embodied as legs 26 of a profiled body 24 with U-shaped cross section in a different setting angle relative to the shaft 14 and the rotor jacket 16. For a rotational direction R of the picking rotors 10, the feeder slat 12b is in a position lagging behind more in the rotational direction. In interaction with the feeder slats 12a which are shown in a position lagging behind less, the feeder slats 12b penetrate upon rotation of the picking rotors 10 the respective intermediate space 36 in which no shear bars 18 have been inserted, respectively, in the embodiment. Due to their angular position relative to each other, the cutting edge of a feeder slat 12b rubs across the surface of the following feeder slat 12b in the rotational direction so that a good cutting and squeezing function on the plant stalks passing through is provided.

Figure 8:
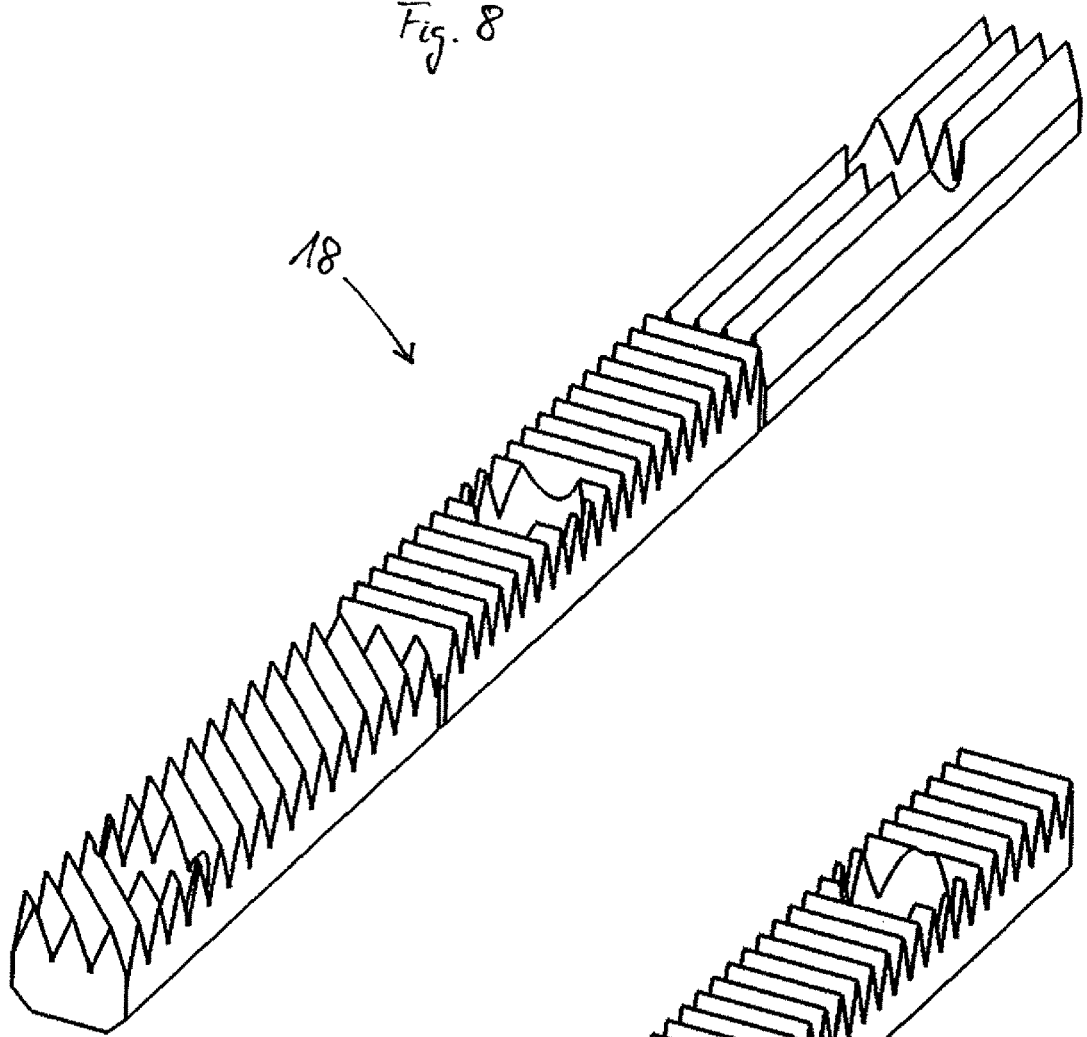
FIGS. 8 and 9: view of different shear bars with structure surfaces.
Figure 9:
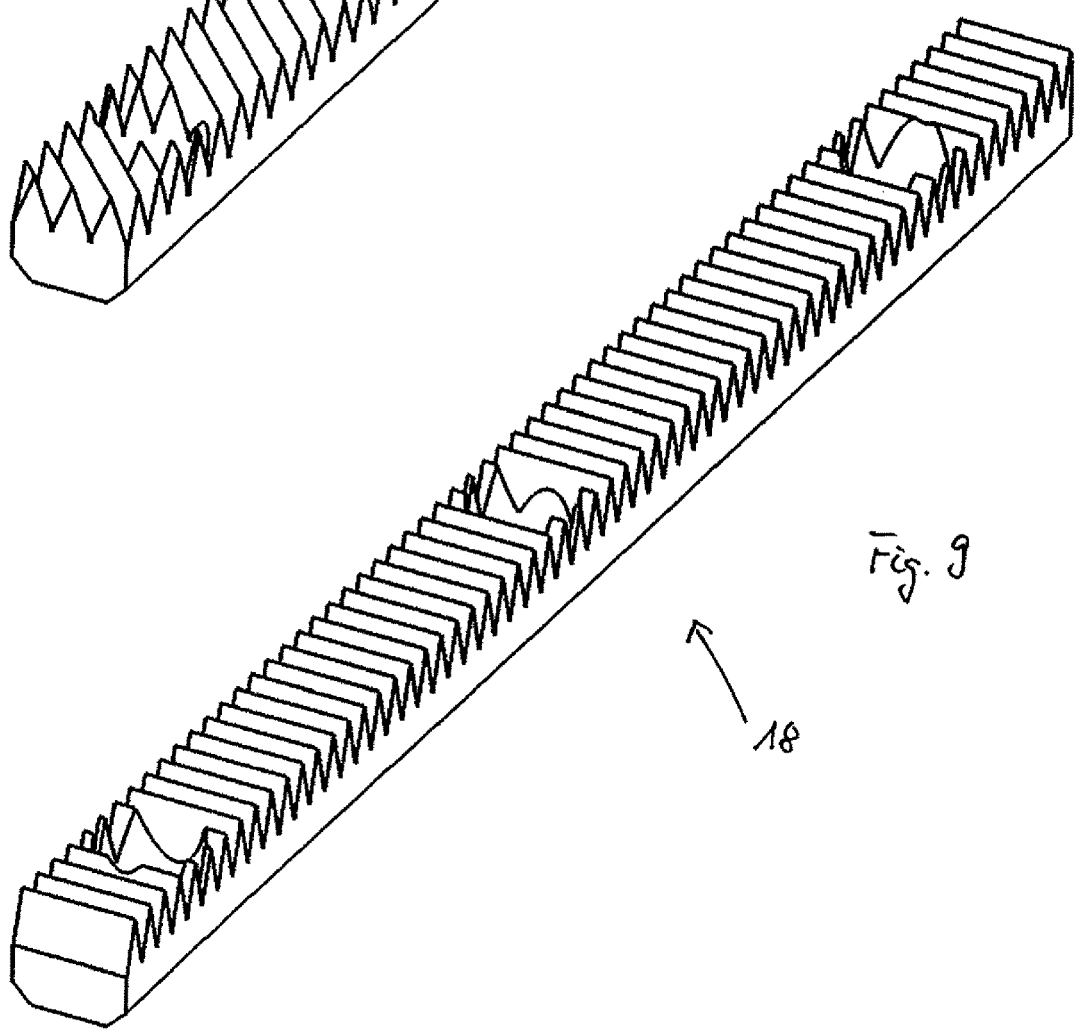

In FIGS. 8 and 9, views of the different shear bars 18 with structured surfaces are illustrated. FIG. 8 shows a shear bar 18 which across its length has differently structured surfaces. While the leading section is provided with ribs oriented at a slant, the central section comprises a plurality of transverse ribs, and the rearward section comprises three grooves which are extending in longitudinal direction of the shear bar 18. In FIG. 9, a shear bar 18 is illustrated which comprises only transverse ribs in addition to the three screw holes. The surfaces can be designed as it appears advantageous for the respectively processed plants and the their ripeness level. Since the properties of the plant stalks change across their length as, for example, their thickness, their degree of lignification, their flexibility and the like, the surfaces of the shear bars 18 can also be adapted across their length by a different structure in regard to these different properties.

The invention is not limited to the afore described embodiment. A person of skill in the art will have no difficulties to modify the embodiment in a way appearing suitable to him in order to adapt it to a concrete application situation.

What is claimed is:

1. An attachment configured to be connected to a harvesting machine, the attachment comprising:
   picking devices arranged adjacent to each other and distributed across a working width of the attachment, the picking devices each comprising picking plates defining a picking gap and each further comprising a first picking rotor and a second picking rotor arranged underneath the picking gap and configured to be rotatingly driven in opposite directions relative to each other;

wherein the first and second picking rotors each comprise a rotor jacket and feeder slats projecting in a radial direction outwardly away from the rotor jacket and defining an envelope circle, wherein the envelope circles of the first and second picking rotors mesh with each other;

wherein between the feeder slats of the first picking rotor first intermediate spaces are defined, and wherein between the feeder slats of the second picking rotor second intermediate spaces are defined;

one or more shear bars arranged in at least one of the first and second intermediate spaces and connected detachably to the respective first or second picking rotor and/or the respective feeder slats, wherein the one or more shear bars fill sections of said at least one of the first and second intermediate spaces when the first and second picking rotors rotate.

2. The attachment according to claim 1, wherein the feeder slats of the first picking rotor engage the second intermediate spaces of the second picking rotor and the feeder slats of the second picking rotor engage the first intermediate spaces of the first picking rotor when the first and second picking rotors rotate, wherein not all of the feeder slats of the first and second picking rotors have associated therewith one of the shear bars in the correspondingly engaged first or second intermediate space.

3. The attachment according to claim 1, wherein the shear bars connected to the first picking rotor or to the second picking rotor have a different height.

4. The attachment according to claim 1, wherein a plurality of the shear bars are connected to a profiled body of one of the feeder slats of the first picking rotor or of the second picking rotor.

5. The attachment according to claim 1, wherein the shear bars have a surface facing radially outwardly and the surface is provided with a structure.

6. The attachment according to claim 1, wherein the shear bars are made of a plastic material.

7. The attachment according to claim 1, wherein the first and second picking rotors each comprise a shaft, wherein the feeder slats are legs of a profiled body with a U-shaped cross section, wherein the profiled body is an element embodied separate from the shaft and mounted on the shaft of the first and the second picking rotors, respectively.

8. The attachment according to claim 7, wherein the shear bars are connected to a base of the profiled body.

9. The attachment according to claim 7, wherein the legs of the profiled body comprise a forward section and a rearward section in a length direction of the profiled body, wherein the forward section of at least one of the legs has a projecting height that is shorter than a projecting height of the rearward section.

10. The attachment according to claim 7, wherein the first intermediate spaces and the second intermediate spaces located between respective profiled bodies that are immediately neighboring each other have no shear bars arranged therein.

* * * * *